United States Patent [19]

Haidlen et al.

[11] 4,266,673
[45] May 12, 1981

[54] APPARATUS FOR CLASSIFYING DUST MATERIALS

[75] Inventors: Goetz Haidlen, Dietzenbach; Edmund Groepl, Muehlheim, both of Fed. Rep. of Germany

[73] Assignee: Wibau Maschinenfabrik Hartmann AG, Gruendau-Rothenbergen, Fed. Rep. of Germany

[21] Appl. No.: 86,356

[22] Filed: Oct. 19, 1979

[30] Foreign Application Priority Data

Oct. 26, 1978 [DE] Fed. Rep. of Germany ....... 2846551
Feb. 17, 1979 [DE] Fed. Rep. of Germany ....... 2906206

[51] Int. Cl.³ .............................................. B07B 7/04
[52] U.S. Cl. ................................ 209/139 R; 209/141; 209/154
[58] Field of Search ................... 209/138, 139 R, 143, 209/154, 140, 141, 147

[56] References Cited

U.S. PATENT DOCUMENTS

| | | | |
|---|---|---|---|
| 1,877,861 | 9/1932 | Hatch | 209/139 R |
| 2,638,217 | 5/1953 | Niemitz | 209/139 R |
| 3,278,026 | 10/1966 | Bishard | 209/147 X |
| 3,655,043 | 4/1972 | Wochnowski et al. | 209/154 X |

FOREIGN PATENT DOCUMENTS

| | | | |
|---|---|---|---|
| 671056 | 9/1963 | Canada | 209/141 |
| 811742 | 4/1959 | United Kingdom | 209/143 |

Primary Examiner—Ralph J. Hill
Attorney, Agent, or Firm—W. G. Fasse; D. F. Gould

[57] ABSTRACT

An apparatus for separating fine dust particles from coarse dust particles, such as are present in hot filling powders for pit furnaces for the production of electrodes by aluminium fusion electrolysis, comprises a first separator with an adjustable separation gap, arranged inside a bin on an intermediate bottom, which is preferably slanted, dividing the bin into an upper chamber and a lower chamber. The air flow is sustained by a fan connected with its discharge side to the lower chamber. The suction side of the fan is connected to the upper chamber through a further separator for the fine particles and through respective pipes. Preferably the suction return path through the pipes and the further separator leads through a further collector.

11 Claims, 3 Drawing Figures

APPARATUS FOR CLASSIFYING DUST MATERIALS

BACKGROUND OF THE INVENTION

The present invention relates to an apparatus for classifying dust materials in a suction pneumatic conveying system operating at pressures substantially between 0.6 and 0.8 bar, comprising a collecting tank having connected thereto a telescoping exhaust pipe. Separators and a pneumatic suction generator are arranged downstream of the collecting tank for the granulometrically classified separation of hot highly abrasive filling powder such as is exhausted particularly from furnaces for the production of block electrodes for aluminium fusion electrolysis after completion of the electrodes.

Said electrode production is described by LUEGER, "Lexikon der Technik", RORO Edition, Vol. 47, pages 164 to 166. For such production, the prepressed block electrodes are introduced, in their green state, into low furnaces, so-called pit furnaces, embedded in filling powder and heated slowly to 1300° C. to 1400° C. and slowly cooled again. This process normally extends over a period of several weeks.

The filling powder generally has a coking coal basis. With a view to an optimally low-dust embedding and obtaining of an optimal granulometry of the filling powder to permit uniform degassing, it is generally necessary to segregate the ultrafine dusts from the reusable filling powder and separate them into granulometric fractions.

For this purpose, heretofore, the filling powder has been sucked out of the stationary pit furnaces into a container mounted on a travelling gantry crane, which was then transported to the end of the furnace shed, let off there and the material was separated into the required granulometric fractions in a stationary screening plant.

This method is on the one hand rather complicated, and on the other hand the space conditions on the crane trolly, the high operating temperature, the low negative pressure and the high throughput capacities do not permit the direct and additional installation of a screening machine on the crane structure.

Air classification is known as a further method of separating powder type bulk materials. This is generally performed in a low pressure zone. For this purpose a segregation and locking out of the vacuum zone would be necessary after the exhaustion of the filling powder. This is impossible in view of the restricted height conditions which already exist in the furnace sheds.

OBJECTS OF THE INVENTION

In view of the above it is the aim of the invention to achieve the following objects singly or in combination:

to provide an arrangement and construction of an air classifier in a suction pneumatic conveying system which will achieve satisfactory operating results under the mentioned operating conditions such as low fluctuating negative pressure varying temperatures;

to provide a classifying apparatus capable of a rapid reaction to temperature fluctuations even under operating conditions fluctuating intensely and at very short time intervals in order to maintain the dynamic pressure constant both in the suction pipe and in the classifying gaps in spite of said fluctuations of the static pressure and of the temperature; and to separate, in the entrance zone of the classifier, the classifying air stream from the conveying air stream proper.

SUMMARY OF THE INVENTION

According to the invention there is provided a classifier equipped with an adjustable classifying gap cross-section arranged within the collecting tank for the coarse material. The classifier is secured to an intermediate bottom dividing said tank into an upper chamber and a lower chamber. The classifier extends through the intermediate bottom and connects the two chambers through at least one gap formed in the classifier for pressure equalization. An exhaust pipe terminates within the classifier. Additionally, a fan is connected to the lower chamber on the pressure side thereof for generating a classifying air stream, which is connected on the suction side of the upper chamber through a separator for the fine material and through a connecting pipe. Said connecting pipe is further operatively connected to a pipe leading to the suction air generator.

This arrangement of a classifier immediately within the collecting tank on said intermediate bottom which preferably is arranged at a slant and which divides the tank into said upper and said lower chamber, permits the formation of a classifying air stream leading through the classifier from below upwardly, which classifying air stream is completely separated from the actual conveying airstream in the region of introduction into the classifier. The classifying air volume and its velocity in the classifying gap is then determined virtually exclusively by the capacity of the additional fan and by the adjustment of the passage cross-section through the classifying gap.

The heavy fractions of the stream of material emerging from the exhaust pipe in the classifier are deflected in the latter, e.g., against a baffle plate, and fall back into the lower chamber of the collecting tank, whereas the finer fractions carried by the classifying air stream, are precipitated substantially in the upper chamber and are discharged from the latter by gravity, in the case of an oblique or slanted bottom.

A further classification is performed by the proposed additional separator, and the material leaving the upper chamber and the material incoming from the downstream separator may be bunkered combined or individually.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE PRESENT INVENTION

Figure 1:
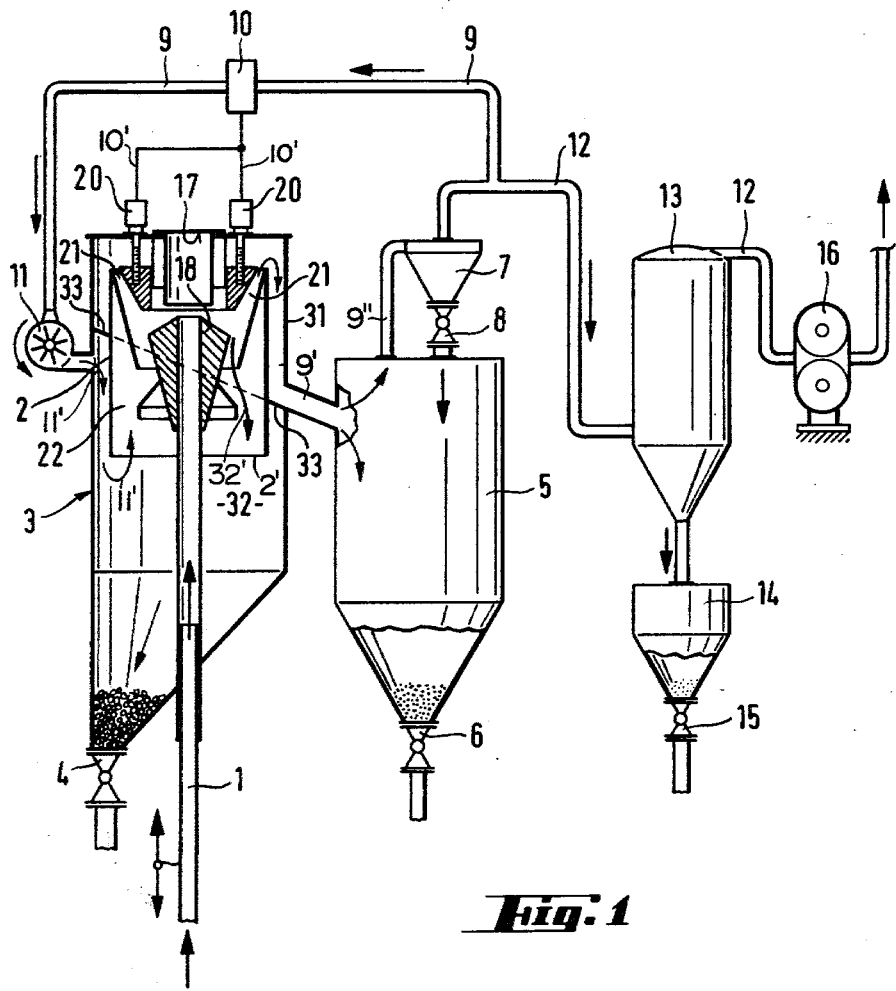
FIG. 1 shows schematically the arrangement and flow diagram of a filling powder exhaustion and classification plant according to the invention, which may be mounted on a gantry crane.

The filling powder plant illustrated in FIG. 1 comprises a telescoping exhaust pipe 1 which issues into or feeds into a classifier 2 and is mounted with its upper end in a distributor plate, or rather a distributor head 18.

The classifier 2 is mounted in the coarse material collecting tank 3 equipped with shut-off valve 4, on an oblique or slanted intermediate bottom 33, whereby the classifier extends through the slanted bottom. The intermediate partitions or bottom 33 divides the collecting tank 3 into an upper chamber 31 and a lower chamber 32. The upper chamber 31 is connected to the settling tank 5 equipped with a shut-off valve 6. The settling tank 5 is in turn connected through shut-off valve 8 to a second classifier or separator 7 for the fine material.

The classifying air flow 11' or circuit leads from the pressure outlet port of a fan 11 into the lower chamber 32 of the collecting tank 3, from there through the classifier 2 or rather through a gap 22 and a classifying gap cross-section 21 in the classifier 2 into the upper chamber 31. The classifying air flow continues into a further or second collecting tank 5 and from there through pipes 9 connected to the separator 7, through the measuring and regulating device 10 back to the suction inlet port of the fan 11. The pipe 9 is also additionally connected to the pipe 12 leading to the pneumatic suction generator 16, preferably through a dust separator 13 with a dust collecting tank 14 operatively connected through a shut-off valve 15.

Figure 2:
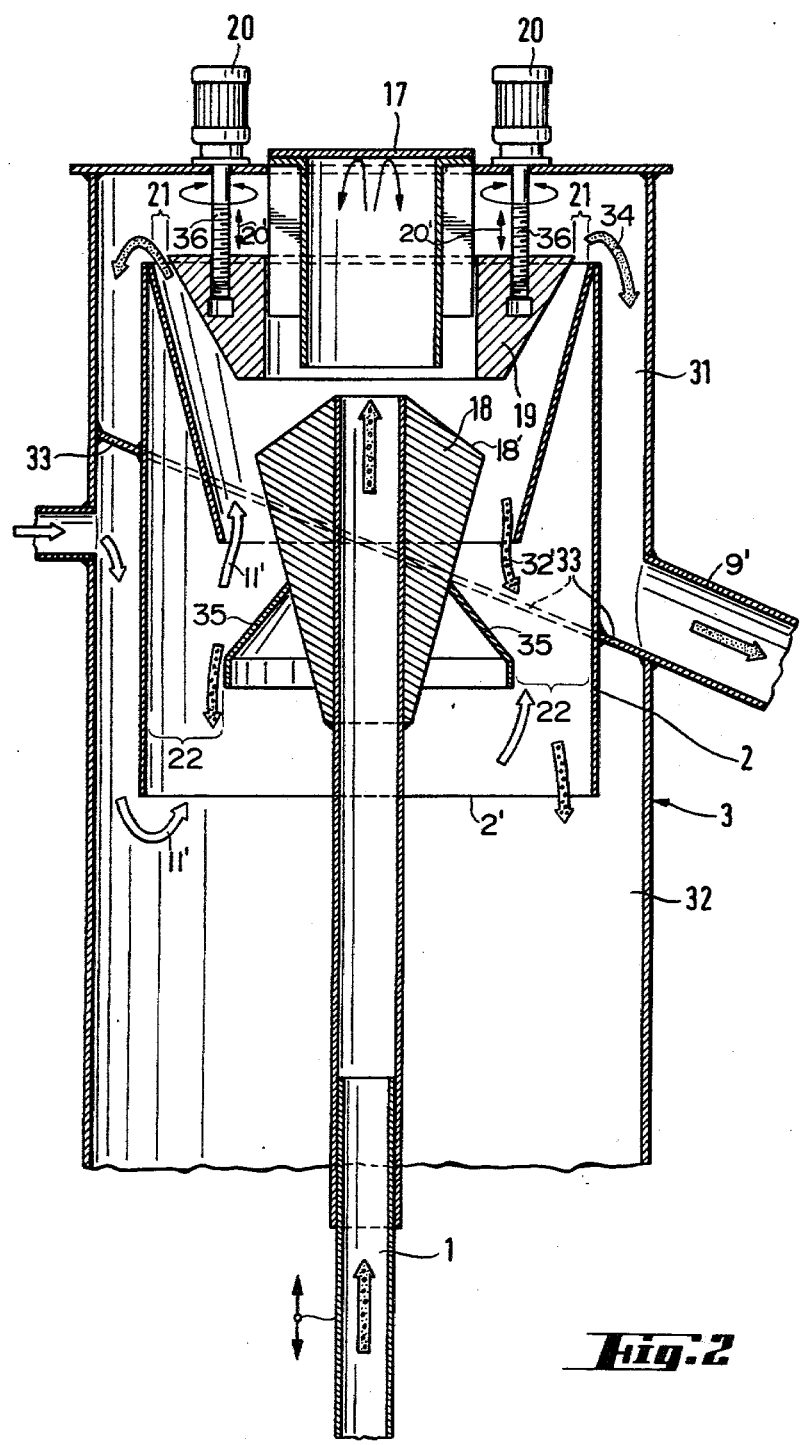
FIG. 2 shows, on an enlarged scale, a sectional view of the classifier.

The construction of the classifier 2 is explained more fully with reference to FIG. 2. A baffle separator 17 is arranged centrically to the outlet of the exhaust pipe so that the central, longitudinal axes of both are aligned. The material which is deflected here, is fed back along the slanted upper surface 18' of the distributor head 18 which is connected to the exit end of the exhaust pipe 1 whereby this deflected material is supplied into the lower chamber 32 as indicated by the arrow 32'.

A conically constructed classifying gap adjusting ring 19 arranged in the upper zone, is adjusted up or down in its position by servomotors 20 as indicated by the arrows 20'.

Figure 3:
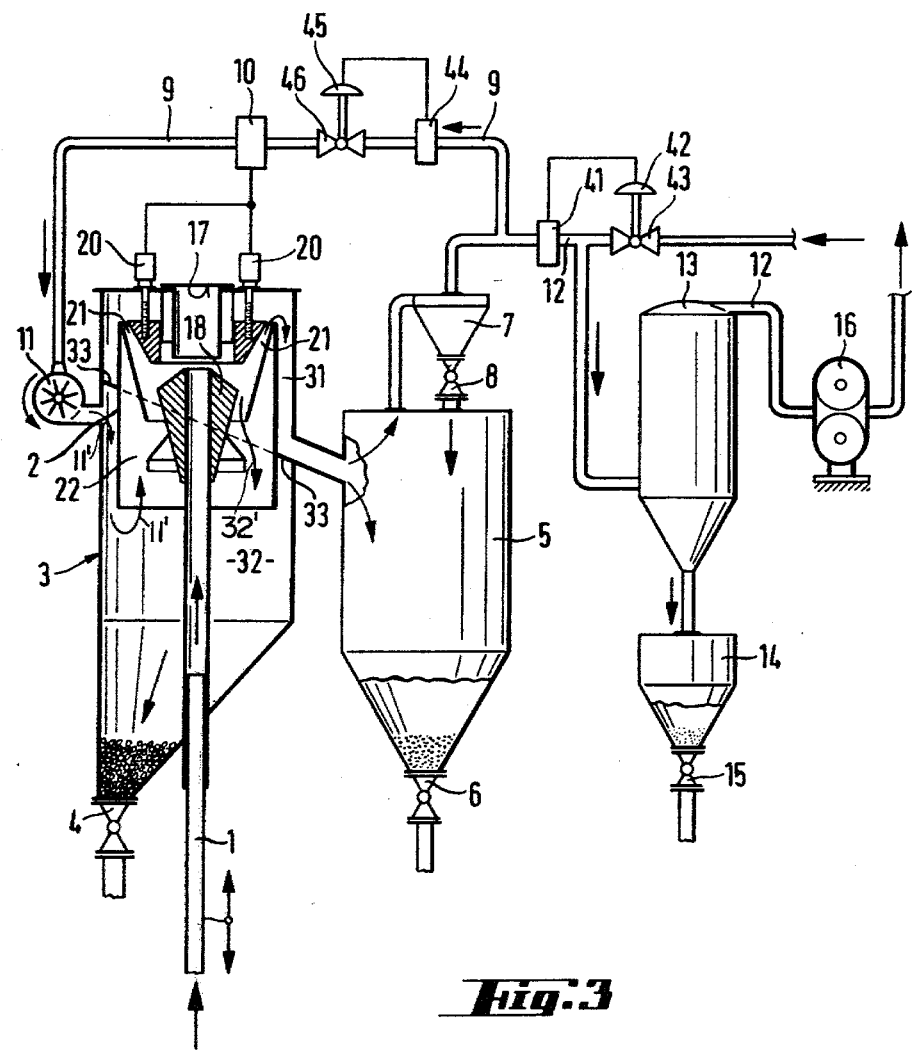
FIG. 3 shows a flow diagram similar to that of FIG. 1, but with differential pressure regulators between the fan and the downstream separator; as well as between the further separator and an additional downstream separator for the dust or fine material.

The additional features for a strongly fluctuating operation will now be explained with reference to FIG. 3. In order to maintain the dynamic pressure in the telescoping exhaust pipe 1 constant, a throughput measuring shutter 41 or a measuring nozzle is installed in the pipe 12. The pressure differential between the total pressure and the static pressure is fed to a regulator 42 which controls a throttle flap 43. The regulator 42 may be a pressure responsive solenoid for operating flap 43. Depending on the position of the throttle flap 43, a larger volume of so-called false air is sucked in from the atmosphere when the pressure differential exceeds the adjustable desired value, whereas the false air volume is reduced when the pressure differential falls below the desired value. By this means the dynamic pressure at the measuring point is maintained substantially constant.

In order to maintain the dynamic pressure in the classifying gaps 21 constant, a measuring shutter 44 or a measuring nozzle, and, downstream of the latter, a throttle flap 46 with a regulator 45, are installed in the pipe 9 of the classifier air circuit. The throttle flap 46 is regulated as a function of the pressure differential at the shutter 44, which differential corresponds to the dynamic pressure.

The above mentioned measuring and regulating sensor device 10 is arranged in the return flow pipe 9 to detect temperature and the pressure in said pipe 9. The output signals of the temperature and pressure sensor 10 are operatively connected through conductors 10' to the control means such as motors 20 for the infinite adjustment of the classifying gap cross-section by moving the adjusting ring 19 up or down (arrows 20'). The control means 20 may be customarily servomotors which are connected to the adjusting ring 19 of preferably conical construction. The ring 19 may be movable up and down by threaded spindles 36 or the like. Since the material coming from the upper chamber 31 of the collecting tank 3 and that coming from the first downstream separator 7 for the fine material may be combined, it is proposed that the additional settling tank 5 is arranged between the classifier 2 and the separator 7, whereby the classifying air circuit extends through the additional settling tank 5.

Since the separation of the coarse fractions is highly abrasive, the above mentioned baffle separator 17 for separating these coarse fractions from the conveying air stream, is preferably an exchangeable component of the classifier apparatus 2, 3.

In order to better handle any fluctuations resulting from variations in the operating conditions occurring in short time intervals, the measuring device or sensor 44 for detecting the dynamic pressure, is operatively arranged in the pipe 9 connecting the downstream separator 7 for the fine material and the fan 11. The output signals of the sensor 44 operate the control device 45, such as a solenoid, for the infinite or continuous adjustment of the throttle flap 46.

The arrangement of the differential pressure regulating means 44, 45, 46 between the fan 11 and the downstream separator 7 makes it possible to maintain the dynamic pressure virtually constant in spite of rapid fluctuations in the static pressure and in the temperature.

A similar regulating means 41, 42, 43 may also be provided in the pipe connecting the separator 7 for the fine material and the dust separator 13 in such a way that a measuring or sensing device 41 for detecting the dynamic pressure is operatively connected to a control device 42, such as a solenoid, for the infinite adjustment of a flap 43 for the induction of false air.

It is furthermore recommended, that the fan 11 and the air suction generator 16 are driven by drive motors with continuously adjustable r.p.m.s, such drives are well known.

In operation, the suction caused by the fan 11 sucks the powder up in the pipe 1. At the upper end of the distribution head or cone 18 all the particles move radially outwardly between the lower edge of the separator baffle 17, the lower edge of the ring 19 and the upper, conical surface 18' of the cone 18. Larger and heavier particles fall downwardly in the direction of the arrow 32' and through the open bottom 2' of the separator 2 into the collector container 3. The fine and lighter particles are entrained by the flow 34 and carried into the upper chamber 31. The flow continues through the pipe 9' into and through the further collector chamber 5.

Certain particles may drop out of the flow for collection in the chamber 5. Still lighter particles are removed from the flow in the separator 7 which they reach through the pipe 9". The third separator 13 is operated by the suction generator 16.

Deflection plates 35, best seen in FIG. 2, make sure that the downwardly travelling particles, as indicated by the arrow 32', are again exposed to the upward stream 11' whereby the separation efficiency is increased.

The present classifier is adjustable to an optimum classification performance, virtually independently of the pneumatic suction, while simultaneously taking into account the relevant instantaneous pressure and temperature conditions.

Although the invention has been described with reference to specific example embodiments, it is to be understood, that it is intended to cover all modifications and equivalents within the scope of the appended claims.

What is claimed is:

1. An apparatus for separating the particles of powdery materials from one another in a conveying system operating under reduced pressure, comprising first collector housing means (3), partitioning wall means (33) operatively secured in said first collector housing means (1) for forming upper and lower chambers (31, 32) in said first collector housing means, classifier means (2) operatively supported on and extending through said partitioning wall means (33), suction pipe means (1) extending axially into said classifier means (2) for maintaining said reduced pressure, suction fan means (11) operatively connected with its pressure port to said first collector housing means (1) for producing a separator air stream, ring means (19) adjustably arranged in said classifier means (2) for forming a ring gap (21) of adjustable cross-sectional area, second classifier means (7), connecting pipe means (9, 9', 9") operatively connecting said upper chamber (31) through said second classifier means (7) to the suction port of said suction fan means (11), further suction means (16) operatively connected to said connecting pipe means, and second collector housing means (5) operatively connected to said connecting pipe means (9, 9') between the first and second classifier means.

2. The apparatus of claim 1, wherein said first classifier means comprises means (35) therein forming a further ring gap (22) which operatively connects said upper and said lower chambers (31, 32) to each other in a pressure equalizing manner.

3. The apparatus of claim 1, wherein said suction pipe means cooperate with said suction fan means for maintaining a reduced pressure in said conveying system within the range of 0.6 to 0.8 bar.

4. The apparatus of claim 1, wherein said suction pipe means (1) comprise telescoping pipe sections.

5. The apparatus of claim 1, wherein said partitioning wall means (33) are arranged to slant toward a zone where said connecting pipe means (9') are connected to said upper chamber.

6. The apparatus of claim 1, wherein said second classifier means (7) are arranged downstream relative to said first classifier means (2) as viewed in the flow direction of the air stream produced by said suction fan means (11), said apparatus further comprising temperature and pressure sensing means (10) operatively arranged in said connecting pipe means (9), and control means (20) operatively responsive to said temperature and pressure sensing means and operatively connected to said ring means (19) for adjusting said cross-sectional area of said ring gap (21) in said first classifier.

7. The apparatus of claim 1, wherein said second classifier means (7) is arranged to discharge into said second collector housing means (5).

8. The apparatus of claim 1, wherein said first classifier means (2) comprise replaceable baffle means (17) operatively arranged for cooperation with the upper end of said suction pipe means (1) inside said first classifier means.

9. The apparatus of claim 1, further comprising dynamic pressure sensor means (44) operatively arranged downstream of said second classifier means (7) in said connecting pipe means (9), throttle means (46) operatively arranged in said connecting pipe means (9), and throttle position control means (45) operatively responsive to said dynamic pressure sensor means and operatively connected to said throttle means (46) for adjusting the flow cross-section of said connecting pipe means in response to dynamic pressure variations.

10. The apparatus of claim 1, comprising third classifier means (13), said further suction means (16) being operatively connected to said connecting pipe means downstream of said second classifier means (7) and through said third classifier means (13).

11. The apparatus of claim 10, further comprising a first pipe section operatively connected to said connecting pipe means (9) downstream of said second classifier means (7), a second pipe section forming a junction with said first pipe section and connecting said first pipe section to said third classifier-means (13), a third pipe section connecting said further suction means (16) to said third classifier means (13), a fourth pipe section operatively connecting the atmosphere to the junction between said first and second pipe section, dynamic pressure sensor means (41) operatively arranged in said first pipe section, throttle means (43) operatively arranged in said fourth pipe section, control means (42) operatively responsive to said dynamic pressure sensor means (41) and operatively connected to said throttle means (43) for regulating the flow of false air through said fourth pipe section.

* * * * *